United States Patent
Konrad

(10) Patent No.: US 6,868,951 B2
(45) Date of Patent: Mar. 22, 2005

(54) SLAVE CYLINDER FOR A HYDRAULIC SYSTEM FOR ACTUATING A FRICTION CLUTCH OF A MOTOR VEHICLE

(75) Inventor: Andreas Konrad, Theres/Untertheres (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/271,009

(22) Filed: Oct. 15, 2002

(65) Prior Publication Data

US 2003/0070542 A1 Apr. 17, 2003

(30) Foreign Application Priority Data

Oct. 17, 2001 (DE) .......................................... 101 51 308

(51) Int. Cl.⁷ .......................... F16D 25/08; F16C 23/04
(52) U.S. Cl. .............................. 192/85 CA; 192/91 A; 192/115
(58) Field of Search ......................... 192/85 CA, 91 A, 192/115, 98, 30; 384/192; 92/161

(56) References Cited

U.S. PATENT DOCUMENTS

| | | | |
|---|---|---|---|
| 4,069,904 A | | 1/1978 | Garrett et al. |
| 4,328,883 A | * | 5/1982 | Shellhause ............. 192/85 CA |
| 4,585,106 A | * | 4/1986 | Shirley ................... 192/85 CA |
| 4,609,087 A | * | 9/1986 | Shirley ................... 192/85 CA |
| 4,660,694 A | * | 4/1987 | Nix et al. ............... 192/85 CA |
| 4,687,084 A | * | 8/1987 | Leigh-Monstevens et al. ... 192/85 CA |
| 4,779,713 A | * | 10/1988 | Tomala et al. ............ 192/88 A |
| 4,903,806 A | * | 2/1990 | Flotow ................... 192/85 CA |
| 4,949,827 A | * | 8/1990 | Leigh-Monstevens et al. ... 192/85 CA |
| 4,995,492 A | * | 2/1991 | Babcock et al. ......... 192/85 CA |
| 5,083,649 A | * | 1/1992 | Baer .......................... 192/98 |
| 5,458,224 A | * | 10/1995 | Takano ................... 192/85 CA |
| 5,598,912 A | * | 2/1997 | Uenohara ................. 192/91 A |
| 5,895,120 A | * | 4/1999 | Campbell et al. ........... 384/420 |

FOREIGN PATENT DOCUMENTS

| | | | |
|---|---|---|---|
| DE | 198 19 970 | 11/1999 | ........... F16D/25/06 |
| EP | 0 371 181 | 6/1990 | |
| GB | 1 373 479 | 11/1974 | |

* cited by examiner

*Primary Examiner*—Saul Rodriguez
(74) *Attorney, Agent, or Firm*—Cohen, Pontani, Lieberman & Pavane

(57) ABSTRACT

Slave cylinder for a pressure medium-actuated system for actuating the friction clutch of a motor vehicle, the slave cylinder including a cylinder housing, which is concentric to a transmission shaft and in which a ring-shaped piston is held, the piston being connected to a clutch-release bearing for actuation of the friction clutch. The cylinder housing is supported on a wall of the transmission to absorb the actuating forces acting on the clutch-release bearing by a mount which can absorb the wobbling movements of the cylinder housing. Wear on the guide and on the seals between the piston and the cylinder housing is reduced due to the ability of the clutch-release bearing to wobble jointly with the piston and the cylinder housing of the slave cylinder around a mount of spherical design and thus to its ability to follow the movements acting on it.

8 Claims, 1 Drawing Sheet

SLAVE CYLINDER FOR A HYDRAULIC SYSTEM FOR ACTUATING A FRICTION CLUTCH OF A MOTOR VEHICLE

BACKGROUND OF THE INVENTION

1. Field of the Invention

The invention pertains to a slave cylinder for a hydraulic system between an internal combustion engine and a transmission of a motor vehicle for actuating a friction clutch, the slave cylinder comprising a cylinder housing, which is concentric to a transmission shaft and in which a ring-shaped piston is held, the piston being connected to a clutch-release bearing for hydraulic actuation of the friction clutch, where the cylinder housing is supported on a wall of the transmission to absorb the actuating forces acting on the clutch-release bearing.

2. Description of the Related Art

A clutch-release device for motor vehicles with hydraulic actuation is known from German Patent Application DE 198 19 970.8. The slave cylinder of this device actuates a clutch-release unit, which is concentric to a transmission axis and can engage and disengage the clutch of a motor vehicle. The clutch-release unit consists of a housing and a piston, which is moved by a pressurized medium; the medium is controlled by a control ring with a pressure line connection and a vent hole. As a result of the cooperation of the control ring with a control groove in the piston, the effect is produced that the slave cylinder always travels the same distance relative to that traveled by the pedal throughout the life of the clutch, even after the clutch has suffered wear.

In a discussion of the previously mentioned clutch-release device, the wear compensation realized over the entire service life of the unit is of less interest than the means used to attach the housing to the wall of the transmission. For this purpose the housing has a flange, which must be screwed to the transmission wall. It can be seen in FIG. 2 that the piston in the housing is connected to a clutch-release bearing, which, as a result of the precise fit of the piston in the housing, has no freedom to move in the radial direction. The clutch-release bearing is in almost continuous contact with the tongues of the diaphragm spring of the clutch, and the tongues almost always have axial run-out at the point where they come in contact with the clutch-release bearing. The tongues thus cause the clutch-release bearing and the piston of the slave cylinder to wobble in correspondence with the first harmonic of the engine rpm's. As a result, increased wear can occur both at the contact points between the clutch-release bearing and the tongues of the diaphragm spring and in the slave cylinder. The wobbling movements are transmitted not only during the clutch-engaging operation but also when the clutch is not released. Whereas the diaphragm springs and thus the tongues are deformed during the release operation and the axial run-out is at least partially compensated, the full axial run-out is present at the clutch-release bearing while the clutch is in the unreleased state. Finally, manufacturing inaccuracies, specifically center offsets and eccentricities attributable in particular to the heat treatment of the diaphragm springs, also allow relative movements to occur between the clutch-release bearing and the tongues.

SUMMARY OF THE INVENTION

Because it can be very expensive to replace a clutch-release bearing or an entire clutch, the exact cost depending on the type of vehicle, it is the task of the invention to mount a slave cylinder between the engine and the transmission of the motor vehicle in such a way that relative movements between a clutch-release bearing and the tongues of the diaphragm spring of a friction clutch are compensated.

To accomplish this task, the slave cylinder is installed between the engine and the transmission in such a way that the clutch-release bearing, which is located on a piston in a cylinder housing of the slave cylinder, can follow any of the wobbling movements which the tongues of the diaphragm springs of the friction clutch may make.

Wobbling movements are thus imposed on the clutch-release bearing for the reasons given above. This wobbling is transmitted to the piston, to which the stationary part of the clutch-release bearing is attached. Finally, the cylinder housing, which has the job of conducting the supporting forces of the clutch-engaging operation to a wall of the transmission, also wobbles. To avoid disadvantages of the type described above, the cylinder housing is installed on the wall of the transmission by a mount of spherical design, so there is no longer any resistance to the pivoting and wobbling movements of the slave cylinder. On the contrary, the tongues of the diaphragm springs can transmit movements to the clutch-release bearing.

The mount of spherical design consists of an outer ring with an inward-facing, concave ball track and a bearing ring with an outward-facing ball track. The outer ring is connected to a bearing flange, which can be attached to the wall of the transmission, and the bearing ring is connected to the cylinder housing. The outer ring preferably forms an integral part of the bearing flange, which is advantageous in the sense that, when the bearing flange is mounted on a centering piece on the wall of the transmission, the outer ring will be centered precisely. It is also advantageous for the bearing flange to be made of plastic, because the outer ring can then be divided by radial slots into a plurality of sections, which have radial elasticity.

The spherical mounting is produced by snapping the bearing ring into the ball track of the outer ring, as a result of which the two ball tracks combine and form a ball joint with a defined pivot point, around which the cylinder housing and thus the slave cylinder with its clutch-release bearing can pivot. The bearing ring is pressed onto a ring-shaped projection on the cylinder housing and thus tightly connected to it. As a result of their elasticity, the sections of the outer ring still have enough pretension after installation of the bearing ring that the spherical mount allows no radial play even at the relatively high axial loads which occur during the clutch-engaging operation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
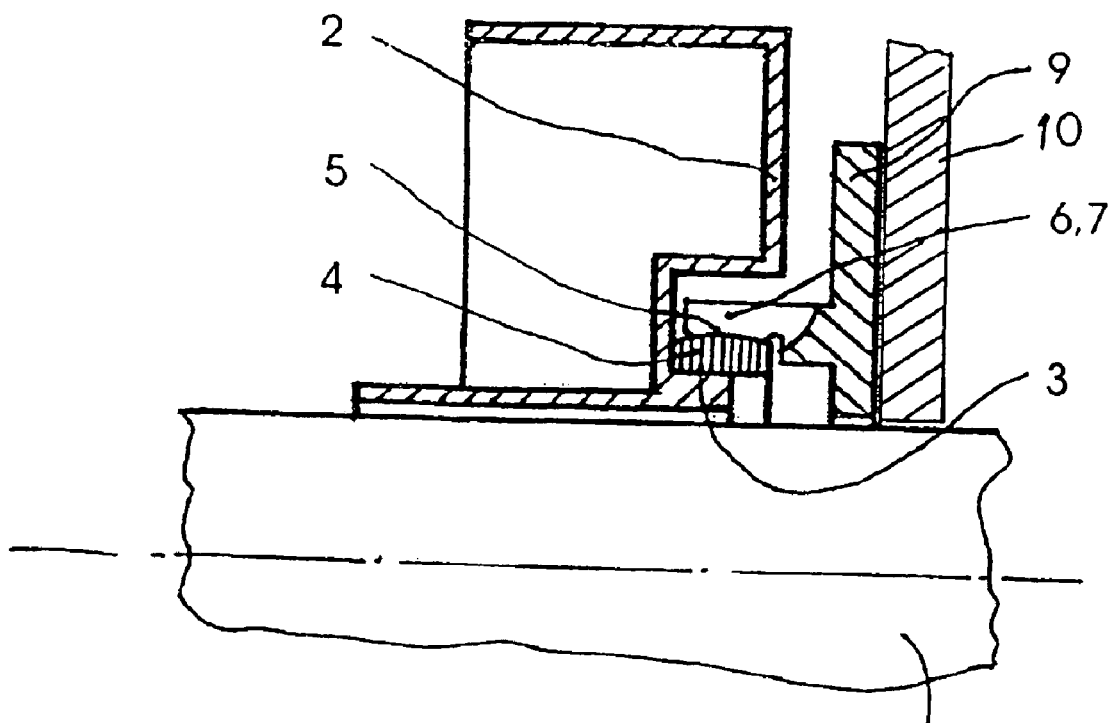
FIG. 1 shows the cylinder housing of a slave cylinder and its spherical mount, consisting of a bearing ring and an outer ring on a bearing flange.
Figure 2:
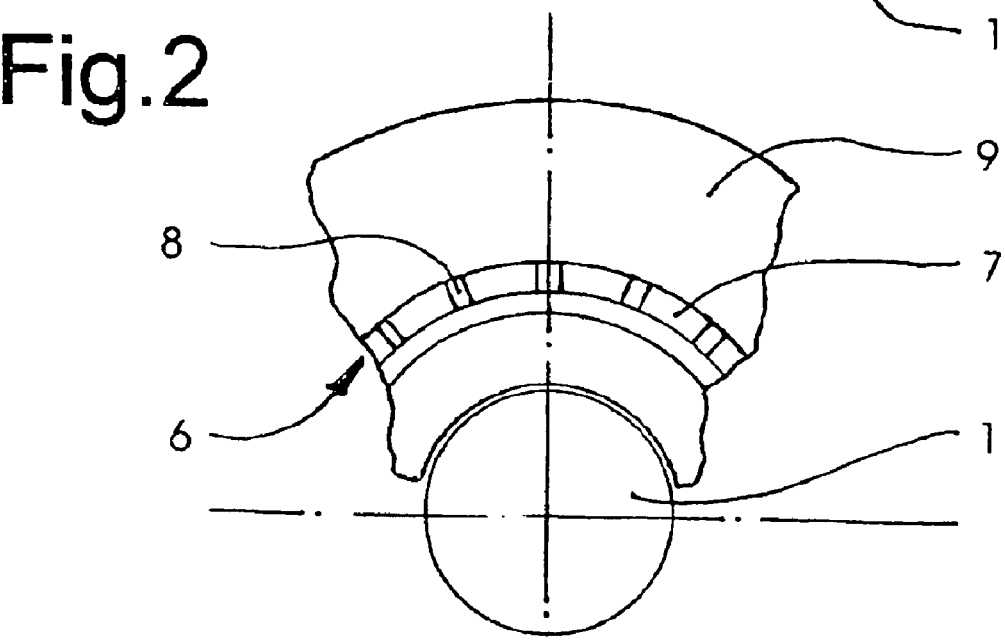
FIG. 2 shows the outer ring on the bearing flange, divided by slots into a plurality of sections.

The slave cylinder, shown only partially in FIG. 1, is arranged centrally around a transmission shaft 1 and consists essentially of a cylinder housing 2 with a ring-shaped projection 3, onto which a bearing ring 4 is pushed. This ring has a ball track 5 on its outer diameter, which is convex in design and which is supported under pretension in a concave ball track of an outer ring 6. The outer ring 6 belongs to a bearing flange 9, which is attached to a wall 10 of the transmission and which has the job of absorbing the axial forces which arise in the slave cylinder during the clutch-engaging operation. The outer ring 6 has radial slots 8, which divide the outer ring 6 into a plurality of sections 7, which have radially oriented elasticity and make it possible for the bearing ring 4 to be snapped into the outer ring 6 and retained by it under pretension.

The advantage of the invention is to be found in the reduction of the wear on the guide and on the seals between the piston and the cylinder housing 2. This reduction is attributable to the ability of the clutch-release bearing to wobble jointly with the piston and the cylinder housing 2 of the slave cylinder around a mount of spherical design and thus to its ability to follow the movements acting on it. As a result of the degree of freedom thus obtained, imposed forces are prevented from acting on the connecting points between the various participating elements.

The invention is not limited by the embodiments described above which are presented as examples only but can be modified in various ways within the scope of protection defined by the appended patent claims.

I claim:

1. A pressure medium actuated slave cylinder for actuating a friction clutch between an internal combustion engine and a transmission having a wall and a transmission shaft, said slave cylinder comprising a cylinder housing which is concentric to the shaft, said housing being designed to hold a ring-shaped piston which is connected to a clutch release bearing, and a mount for mounting said cylinder housing to said wall of said transmission so that the cylinder housing can wobble with respect to the transmission, said mount comprising a concave spherical ball track fixed to one of said cylinder housing and said mount, and a convex spherical ball track fixed to the other of said cylinder housing and said mount, said convex spherical ball track engaging in said concave spherical ball track.

2. A slave cylinder as in claim 1 wherein said mount comprises an outer ring with said concave spherical ball track, wherein said concave spherical ball track is an inward facing concave spherical ball track, and a bearing ring with said convex spherical ball track, wherein said convex spherical ball track is an outward facing convex spherical ball track.

3. A slave cylinder as in claim 2 wherein said mount comprises a bearing flange which can be connected to the wall of the transmission, said outer ring being fixed to said bearing flange, said bearing ring being fixed to said cylinder housing.

4. A slave cylinder as in claim 3 wherein said bearing flange is made of plastic.

5. A slave cylinder as in claim 2 wherein said outer ring has at least two radially extending slots which separate the outer ring into sections having radial elasticity.

6. A slave cylinder as in claim 2 wherein said bearing ring can be snapped into said outer ring to form a ball joint around which said cylinder housing can pivot.

7. A slave cylinder as in claim 2 wherein said cylinder housing comprised a ring-shaped projection onto which said bearing ring is pressed.

8. A slave cylinder as in claim 5 wherein said sections exert a permanent pretension on the spherical ball track of the bearing ring.

* * * * *